United States Patent [19]

Kremer

[11] Patent Number: 4,960,532
[45] Date of Patent: Oct. 2, 1990

[54] DUST SUPPRESSANT FORMING A RESILIENT LAYER

[75] Inventor: Henry A. Kremer, Richmond Hill, Canada

[73] Assignee: Carbochem Inc., Ontario, Canada

[21] Appl. No.: 262,841

[22] Filed: Oct. 26, 1988

Related U.S. Application Data

[63] Continuation of Ser. No. 88,234, Aug. 24, 1987, abandoned.

[51] Int. Cl.$^5$ .................................. C09K 3/22
[52] U.S. Cl. ............................ 252/88; 299/12; 404/76
[58] Field of Search ............... 252/88; 299/12; 404/76

[56] References Cited

U.S. PATENT DOCUMENTS

| | | | |
|---|---|---|---|
| 819,012 | 4/1906 | Hardcastle | 252/88 |
| 855,860 | 6/1907 | Mattar et al. | 252/88 |
| 924,086 | 6/1909 | Meadows et al. | 252/88 |
| 1,340,855 | 5/1920 | Weiss | 252/88 |
| 2,116,682 | 5/1938 | Kleinicke et al. | 44/6 |
| 2,448,605 | 9/1948 | Kleinicke | 44/6 |
| 2,621,115 | 12/1965 | Van Order | 44/6 |
| 2,646,361 | 7/1953 | Rostler | 106/238 |
| 2,670,332 | 2/1954 | McCoy et al. | 252/311.5 |
| 2,786,815 | 3/1957 | Buggisch et al. | 252/88 |
| 2,814,554 | 11/1957 | Rowse | 51/298 |
| 3,708,319 | 1/1973 | Nimerick et al. | 106/253 |
| 4,214,875 | 7/1980 | Kromrey | 44/6 |
| 4,264,333 | 4/1981 | Shaw | 44/6 |
| 4,316,811 | 2/1982 | Burns et al. | 252/88 |
| 4,369,171 | 1/1983 | Grindstaff et al. | 423/461 |
| 4,561,905 | 12/1985 | Kittle | 134/25.1 |
| 4,642,196 | 2/1987 | Yan | 252/88 |
| 4,650,598 | 3/1987 | Roberts et al. | 252/88 |

FOREIGN PATENT DOCUMENTS

| | | | |
|---|---|---|---|
| 0631086 | 11/1961 | Canada | 252/88 |
| 0513846 | 12/1930 | Fed. Rep. of Germany . | |
| 2305482 | 10/1976 | France | 252/88 |
| 2524899 | 10/1983 | France . | |
| 9025871 | 2/1984 | Japan | 252/88 |
| 1506765 | 4/1978 | United Kingdom . | |

*Primary Examiner*—Paul Lieberman
*Assistant Examiner*—A. Beadles-Hay
*Attorney, Agent, or Firm*—Antoine H. Gauvin

[57] ABSTRACT

This suppressant comprises at least 45% water. A water thickening agent is dissolved in water, and forms with water the dispersion medium. A coal tar pitch is dissolved in an aromatic solvent and forms the dispersed liquid which results in suspension. The aromatic solvent has generally a residual softening point of about 40°–70° C. (as measured by ASTM-D-36). This dust suppressant has a viscosity of 3500 to 15000 cps at 25° C. A process for making same comprises: 1- adding to water having a pH of about 7 to 9, a thickening agent to form a dispersion medium having a viscosity of at least 2000 centipoises at 25° C. as measured with ASTM-D4420, with a Brookfield, 2- dispensing under high shear conditions into the dispersion medium, a pitch dissolved in an aromatic solvent, at least 70% of which is boiling over 270° C., to obtain a (in concentrate form) suspension having at least 45% water content. The concentrate form may be diluted to obtain a diluted suspension having 90–98% water content by weight, and 2–10% by weight of the concentrate form, and used by directly spraying the diluted suspension at the rate 10–40 grams of solids per metric ton of dusting material.

32 Claims, No Drawings

DUST SUPPRESSANT FORMING A RESILIENT LAYER

This is a continuation application of application 088,234, filed 08/24/87, now abandoned.

FIELD OF THE INVENTION

This invention is directed to a new aqueous dust suppressant dispersion containing coal tar pitch and forming in a one step a resilient layer on dusting materials or substances such as ores, coal and the like, hereinafter referred to as "dusting materials" for sake of brevity. This invention is particularly useful for fugitive emissions of dusting materials during transport in moving trains, and is also directed to a process of making said dispersion, and to a one step method of treating dusting materials with said dispersion.

BACKGROUND OF THE INVENTION

Transporting dusting materials is a problem, even more with coal which has the distinctive yet unfortunate quality of being highly visible, deep black in colour, and perceived by the public as a threat to health, as well as an aesthetic blight on our environment. Windy conditions around stockpiles or during product handling or transportation can carry fine dust particles over large distances to sensitive locations. Areas negatively affected include: (1) increased on-site maintenance of industrial equipment; (2) environmental damage to agricultural areas and private properties, (3) concern for human health, and (4) weight loss.

Conventional dust suppressants

Many conventional products produce a cohesive but brittle "skin" with little weight and binding to a substrate. These products rely solely upon their cohesive strength to maintain a surface cover to provide protection from wind entrainment of the dust particles.

Some involve wetting agents, others emulsifying agents: A wetting agent is a product which reduces the contact angle between the substrate and a coating "flattening the roundness". A surfactant in which emulsifying agents are classified, is a product reducing the surface tension, and the contact angle, preventing coagulation of particles and helping film formation.

Shaw et al discloses in Canadian Patent No. 1,062,967 (or its U.S. Pat. No. equivalent 4,264,333) a method which consists in wetting the coal in a first step, with a wetting agent which can be cationic, anionic and preferably nonionic, then adding in a second step a coal tar emulsion obtained with a cationic emulsifying agent. Shaw's method produces a thin skin or a film with little weight and low binding strength to the substrate. U.S. Pat. No. 2,448,605, Kleinicke, discloses a product consisting of fatty acids, a petroleum oil soluble wetting agent, a low viscosity hydrocarbon distillate having a high aromaticity component solvent for the fatty acid, a wetting agent, and a petroleum oil of the order of Bunker "C" oil miscible with petroleum oil and in dominating proportion. U.S. Pat. No. 2,621,115, VanOrder, discloses an oil-in-water emulsion from ultramarine, an oil forming a refraction index between 1.35 and 1.75, an emulsifying agent and at least 71% water. Rubber latex was also suggested by Booth et al in U.S. Pat. No. 2,854,347.

Coal tar contains light oils, tar acid oils (i.e. phenols, creosols and homologues), naphthalene oils, wash oils, light anthracene oils, heavy anthracene oils and a residue which remains after the removal of heavy anthracene oils, that residue being commonly called coal tar pitch.

THE INVENTION

Applicant's suspension which is a dust suppressant without addition of anti-freeze compounds, is generally less susceptible to freezing and is less susceptible to blocking the spray nozzles than the conventional products, i.e. the dust suppressant, providing more cohesive crust as compared against the prior art. The new product, i.e. the dust suppressant, is also easy to store, handle, use and apply. It is generally directly applied and does not require emulsifying or wetting agents.

Formation of a thick resilient layer

In association with coal, applicant's suspension penetrates the surface of coalbeds, down as much as four inches or more, to form a resilient and not a rigid layer, which remains relatively soft: This layer has a certain amount of give and is elastic as opposed to rigid, providing continued bonding of coal particles. This is a real advantage over rigid dust suppressants which tend to break during shunting of trains. Applicant's innovative new advance in dust control technology of dusting materials thus yields a product with continuously regenerative capabilities.

Applicant's suspension is a dust suppressant that penetrates the surface down four inches or more to form a resilient layer surpassing crust retention values of all other products tried at comparable solid content. The deep penetration is achieved by the excellent wetting capabilities of applicant's suspension, enhanced by the natural affinity between the coal and applicant's suspension. Removal of the surface layer by wind shear is thus inhibited by the deep penetration of the suspension and the natural weight of the formed crust.

If the upper portion of a dust suppressant layer over a dusting material breaks, the lower portion of the suppressant layer still protects the materials from dusting, because of the thick penetration of the dust suppressant into the dusting materials, such as coal. Such a behavior has been referred to by those skilled in the art as "regenerating", "regenerative" or "self-regenerating", because in the prior art, the known dust suppressants produce over coal, for instance, a carpet-like layer, which breaks during shunting or transportation, leaving open the dusting materials.

The new product minimizes dust losses during storage and transportation: Surface coverage in association with coal, is generally 90% and higher as compared against approximately 85% or slightly more or less achieved previously by other products at the same solid level. It also enables the elimination of significant environmental impact, and compliance with regulatory agency environmental requirements.

The Product

Broadly stated, the invention is directed to an aqueous dust suppressant concentrate, comprising, based upon the weight of the concentrate, from 80% to 45% water having a pH from about 7 to 9 and containing a water thickening agent dissolved in said water and forming with said water a dispersion medium, the amount of said thickening agent not exceeding 3% by weight of the water and having a viscosity, as measured by ASTM-D4402, of at least 2000 centipoises (cps) at 25° C., and from 20% to 55% by weight of a coal tar pitch dissolved in an aromatic solvent boiling substantially over 270° C. and forming the dispersed liquid, said aromatic solvent being present in an amount that renders liquid said pitch during its making, said dust suppressant being substantially free from surfactants, emulsifying and wetting agents, 2 to 10 parts of said concentrate upon dilution and mixing with 98 to 90 parts of additional water yielding 100 parts by weight of a dilute aqueous dust suppressant being sprayable and able to form a thick crust of a resilient layer penetrating said dusting materials.

Preferably the coal tar pitch is dissolved in an aromatic solvent, at least 70%±2% said aromatic solvent boiling substantially over 270° C., and has a residual softening point of about 40° to 70° C. as measured by ASTM-D-36.

Aqueous dust suppressant concentrate

For the concentrate, the water is preferably 70%.

Generally between 20 and 55% and preferably 30% of the dispersed liquid i.e. the coal tar pitch with the aromatic solvent, is present when the dust suppressant is a concentrate.

Said dispersion has preferably a viscosity of 3500 to 15000 cps at 25° C.

When making the concentrate, the ratio of the weight of the dispersion medium i.e. water is generally between 1.25 to 13 per part of the dispersed liquid (i.e. coal tar pitch with the aromatic solvent) forming droplets having a size average of 500 to 5000 micrometers (formally called microns).

This dust suppressant is particularly suited for coal where it forms a resilient penetrating layer, said dust suppressant being self-regenerating. This dust suppressant may however be used on other materials such as coke, sulfur, clay, lime, and other pulverized materials and minerals such as silicates which are clay-like, lime and lime-like products, such as, for instance, gypsum and generally any other material compatible with this dust suppressant: that is whereby the dust suppressant is film formable over said dusting material.

Process

The invention is also directed to a process for making an aqueous dust suppressant which comprises:
(a) adding to water having a pH of about 7 to 9, a thickening agent in an amount not exceeding 3% by weight of the water and dissolved in said water, and forming with said water a dispersion medium having a viscosity of at least 2000 centipoises at 25° C. as measured by ASTM-D4420 with a Brookfield, and preferably 3500 to 15000 centipoises and much preferably 3500-8000, (Higher viscosity could be used if desired bearing in mind that the suspension should possess good handling characteristics to be mixed or sprayed.)
(b) dispersing under high shear conditions into about 1.25 parts to 13 parts by weight of said dispersion medium, one part of pitch dissolved in a aromatic solvent at least 70% of which boiling substantially over 270° C., and said aromatic solvent being present in an amount that renders liquid said pitch during its making, said pitch having a residual softening point of about 40° to 70° C. as measured by ASTM-D-36, said aromatic solvent being substantially the solvent agent of said pitch, and thereby obtaining a suspension, having at least 45% water content.

Diluted suppressant for direct spraying

The invention also embraces diluting the suspension in concentrate form to obtain a diluted suspension having 90-98% water content by weight and 2-10% by weight of the suspension in concentrate form, thereafter directly spraying at the rate of 0.5-3 liter of concentrate form said diluted suspension per metric ton of dusting material such as coal, which is equivalent to approximately 45-300 liter of the dusting material per rail car. This corresponding to 10-40 grams of suspension solids (i.e. non-aqueous portion consisting of pitch dissolved in the aromatic solvent) per metric ton of dusting material. The surface dimension of a rail car is variable, for instance the dimension may range between 75×12 feet, to 50×10 feet.

Thickening agents

By the expression: "thickening agent" is meant a product either organic or inorganic, that increases the viscosity of water and is compatible with the solution of coal tar pitch to be suspended in water.

Typical examples of organic thickening agents include: various starches, cellulose ethers such as the carboxy-alkyl types. For instance, sodium carboxymethyl cellulose, sodium carboxyethyl cellulose, sodium hydroxy-propyl cellulose, sodium hydroxy-ethyl cellulose. Synthetic long chain polymers having bi-functional repeating units, where the bi-functional units have a linking function generally located at one end of the units to link the units into a polymer, and a hydrophilic function generally located at the other end of the units. Examples of linking units include, for instance, polymerizable olefinic groups, and of hydrophilic functional groups include carboxylic groups such as acids, esters, salts, preferably of sodium and ammonium and the like.

Synthetic long chain polymers include polyacrylates, glycerols, glycols, polyglycols and homologues thereof.

Typical examples of inorganic thickening agents include, lime, calcium chloride, aluminum salts such as $Al_2(SO_4)_3$ and the like, phosphates like sodium orthophosphates ($Na_3PO_4$), alkalies such as ammonium hydroxide and/or sodium hydroxides in association with clay or phosphates.

By the expression: "coal tar pitch" is meant the solid distillation residue, that is water-insoluble, left behind after coal tar distillation or fractionation of the various cuts having a boiling point up to 300° C. The cuts removed are such as light oils, tar acid oils (i.e. creosols, phenols, and homologues), naphthalene oils, and some of the higher boiling distillates, i.e. part of wash oils and anthracene oils, essentially most of the components boiling up to 300° C., bearing in mind the azeotropic characteristics of the solvents preventing complete separation at a given boiling point.

PREFERRED WAY OF CARRYING OUT THE INVENTION

The adjustment of the pH is normally done by the addition of NaOH, although other basic material that are not detrimental to the formation of the suspension may be used.

The amount of thickening agent to be added cannot be set in percentage but is such as to adjust the water which will form the dispersion medium to a viscosity of at least 2000 cps at 25° C. as measured by Brookfield viscosimeter and according to ASTM-D4402, but is less than 3% by weight of the water used to dissolve it to make the dispersion medium.

Normally the addition of the coal tar pitch in solution further raises the viscosity of the dust suppressant above 3000 cps. The coal tar pitch which is the solid residue of the distillation is dissolved with anthracene oil, say for instance, in a weight ratio in the order of 17 to 3, that is, in order to render liquid the pitch during its making.

Preferably, the aromatic solvent has a boiling point range of 240°–380° C. Among the preferred aromatic solvents are heavy anthracene oils having less than 1% material boiling below 235° C., (as measured by ASTM-D20 method) less than 30% material boiling below 270° C., and less than 75% material boiling below 355° C.

The pitch dissolved in high boiling solvents such as anthracene oils may be obtained either by dissolving the pitch with anthracene oils to obtain the required product specification or by obtaining from a coal tar distillation directly the fraction containing the soft pitch.

In a preferred emobodiment, the pitch dissolved in anthracene oils has the following: viscosity data: Brookfield viscosimeter, thermosel spindle #31 speed 12 RPM viscosity at 100° C. 210±25 cps, and at 150° C. spindle #31, 30 RPM 35±5 cps.

The dispersion medium is brought under such conditions with a colloid mill such as a "Lancaster Dispenser" made by Johanson, N.Y. having a production capacity of approximately 4500 liters/hr of dispersion. A ribbon mixer may also be used as well as other colloid mills and high performance mixers. The suspension is obtained nearly instantaneously.

Preferably the pitch dissolved in boiling solvent is brought hot in the dispersion medium, the pitch being at a temperature above the boiling point of the dispersion medium. Most preferably, the dispersion medium is at a temperature of about 40–70° C. when mixed with the pitch dissolved in hot solvent.

Preferably, the product i.e. the dust suppressant, is supplied in concentrated form as high as 50% and more to be diluted to concentration as low as 2% on site prior to application. Dilution can be performed using either a batch process or in-line mixing. The suspension is generally stable for a short time, down to as low as ½% active material i.e. coal tar pitch in the aromatic solvent. The two most important parameters in the choice of spray solution are the concentration of said active material (non-aqueous ingredients) and the total volume of the solution per area. The quantity of the concentrate chosen, determines the cohesive and regenerative strength of the binder solution whereas the total volume applied determines the depth of penetration and therefore the thickness of the layer of impregnation.

In a particular embodiment for each part by weight of water having a thickening agent, there is about an equivalent part by weight of the solution of pitch dissolved in anthracene oils, and the viscosity of the pitch is over 100 centipoises at 50° C. and preferably 3000 cps at 50° C.

Typical applications of applicant's product include the suppression of dust during handling and transportation of coal. The diluted solution is spread onto the coal surface by means of spray nozzles such as spray bars without clogging piping or nozzles. The concentrate/water dilution ratios required for various concentrate quantities and total volumes used are illustrated on Table 1 for coal. The recommended concentrate quantity and spray volume are also highlighted.

TABLE 1

APPLICATION REQUIREMENTS FOR COAL TRAINS DILUTION RATIOS AT VARIOUS CONCENTRATIONS AND VOLUMES

| Aqueous dust suppressant in concentrated form Quantity (l./car) | Total Volume Sprayed of diluted form (per car) | | |
|---|---|---|---|
| | 90 l. Dilution rate* | 140 l. Dilution rate* | 180 l. Dilution rate* |
| 0.5 | 1:180** | 1:280 | 1:360 |
| 1.0 | 1:90 | 1:140 | 1:180 |
| 1.5 | 1:60 | 1:93 | 1:120 |
| 2.0 | 1:45 | 1:70 | 1:90 |
| 2.5 | 1:36 | 1:56 | 1:72 |
| 3.0 | 1:30 | 1:47 | 1:60 |
| 3.5 | 1:26 | 1:40 | 1:51 |
| 4.0 | 1:23 | 1:35 | 1:45 |

*part of suspension in concentrate form: parts of diluted suspension
**i.e. 0.5 liter of concentrate + 89.5 liter of water to make 90 l.

EXAMPLES 1–5

A dust suppressant in concentrate form having the following characteristics was made:

| | |
|---|---|
| 1. Solids (coal tar pitch in aromatic solvent) | approx. 30 ± 2% |
| 2. Viscosity @ 25° C., Brookfield RVF, Spindle #4 ASTM-D4402 | 3500–8000 cps |
| 3. pH | 7–9 |
| 4. Spreadability | excellent |
| 5. Film formation after dilution 5 times | good (no droplets) |
| 6. Chemical composition | coal tar pitch base approx. 30 ± 2% i.e. approx. 25.5% pitch and 4.5% aromatic solvent |
| 7. Freeze Thaw Stability | susceptible without antifreeze |
| 8. Volatile Phase | water approx. 70+2% |
| 9. Thickener | sodium polyacrylate having a reactivity of 190 g/mole in an amount to reach viscosity set under 2. |

The product was used on coal trains as per Table 2 and found to yield a surface coverage of 90% and higher.

TABLE 2

COAL CRUST RETENTION ANALYSIS TESTS - SUMMARY

| | EXAMPLE NO. | | | | |
|---|---|---|---|---|---|
| | 1 | 2 | 3 | 4 | 5 |
| Application rate of concentrate form suspension per car (liter/car) | 3.6 | 3.5 | 2.3 | 1.7 | 1.0 |
| Nozzle pattern | 1 | 1 | 2 | 2 | 2 |
| Front slope (deg) | 6 | 13 | 12 | 11 | 10 |
| Front length (ft) | 4 | 5 | 3 | 4 | 5 |
| Exposure on front (%) | 13 | 19 | 3 | 4 | 44 |
| Exposure on centre (%) | 0 | 0 | 0 | 0 | 1 |
| Rear slope (deg) | 14 | 33 | 28 | 32 | 15 |
| Rear length (ft) | 5 | 7 | 4 | 6 | 5 |
| Exposure on rear (%) | 50 | 33 | 3 | 6 | 89 |

TABLE 2-continued

COAL CRUST RETENTION ANALYSIS TESTS - SUMMARY

| | EXAMPLE NO. | | | | |
|---|---|---|---|---|---|
| | 1 | 2 | 3 | 4 | 5 |
| Total coverage (%) | 94 | 93 | 100 | 99 | 84 |

EXAMPLE 6

The same was repeated as in Example 1 except that 0.1–0.5% of $CaCl_2$ was used as thickener under 9, the pH was 7.5–9 under 3.

EXAMPLE 7

Although the dust suppressant is particularly useful on coal, it is also effective on other compatible dusting materials for example when the dusting material used was powdered sulfur.

Having described the invention, modifications will be evident to those skilled in the art without departing from the spirit of the invention, as defined in the appended claims.

I claim:

1. An aqueous dust suppressant concentrate comprising: based upon the weight of the concentrate,
   from 80 to 45% water having a pH from about 7 to 9, and containing a water thickening agent dissolved in said water and forming with said water a dispersion medium, the amount of said thickening agent not exceeding 3% by weight of the water but being such as to obtain a dispersion medium having a viscosity, as measured by ASTM-D-4402 of at least 2000 centipoises at 25° C, and
   from 20 to 55% by weight of a coal tar pitch dissolved in an aromatic solvent boiling substantially over 270° C., and forming a dispersed liquid, in said aromatic solvent being present in an amount that renders liquid said pitch during its making,
   said dust suppressant concentrate being substantially free from surfactants, emulsifying and wetting agents,
   2 to 10 part of said concentrate upon dilution and mixing with 98 to 90 parts of additional water yielding 100 parts by weight of a dilute aqueous dust suppressant being sprayable and able to form a thick crust of a resilient layer penetrating dusting materials.

2. The dust suppressant concentrate as defined in claim 1, containing about 30%±2% of the coal tar pitch dissolved in the aromatic solvent and about 70%±2% water containing the water thickening agent.

3. The dust suppressant concentrate as defined in claim 1, wherein said thickening agent is a polyacrylate thickening agent.

4. The dust suppressant concentrate as defined in claim 1, wherein said thickening agent is sodium polyacrylate.

5. The dust suppressant as defined in claim 1, being diluted, and having between 90 and 98% water and 10 and 2% of dust suppressant concentrate as defined in said claim 1.

6. The dust suppressant concentrate as defined in claim 1, wherein at least 70% of said aromatic solvent is boiling substantially over 270° C., and wherein the pitch has a residual softening point of about 40–70° C. as measured by ASTM-D-36,
said dispersed liquid forms droplets having a size average from 500 to 5000 micrometer, and
said dispersion medium has a viscosity of 3500 to 15000 cps at 25° C.

7. The dust suppressant concentrate as defined in claim 6, wherein the thickening agent is selected from the class consisting of starches.

8. The dust suppressant concentrate as defined in claim 6, wherein the thickening agent is selected from the class consisting of long chain polymers having bifunctional repeating units consisting of a linking function and a hydrophillic function.

9. The dust suppressant concentrate as defined in claim 6, wherein the thickening agent is selected from the class consisting of inorganic thickening agents.

10. The dust suppressant as defined in claim 6 wherein said dispersion has a viscosity of 3500 to 8000 cps.

11. A coal dust suppressant concentrate which upon dilution can form a resilient layer and penetrating layer with coal comprising: based upon the weight of the concentrate,
    from 80 to 45% water having a pH from about 7 to 9, and containing a polyacrylate thickening agent in an amount not exceeding 3% by weight of said water, dissolved in said water and forming with said water a dispersion medium, having a viscosity, as measured by ASTM-D-4402 of at least 3000 centipoises at 25° C., and
    from 20 to 55% by weight of a dispersed liquid of coal tar pitch in anthracene oils, at least 70% of said anthracene oils having a boiling point substantially above 270° C., and being present in an amount that renders liquid said pitch,
    said dust suppressant concentrate being substantially free from surfactants, emulsifying and wetting agents,
    2 to 10 parts of said concentrate upon dilution and mixing with 98 to 90 parts of additional water yielding 100 parts of a dilute sprayable aqueous coal dust suppressant being sprayable and able to form a thick crust of a resilient layer penetrating coal.

12. The coal dust suppressant concentrate as defined in claim 11, upon said dilution, wherein said dilute aqueous dust suppressant on spraying on coal yields a resilient layer penetrating coal, said dust suppressant being self regenerating, that is the lower portion of the resilient layer still protecting the coal from dusting when the upper portion of the layer breaks.

13. The coal dust suppressant concentrate as defined in claim 11, wherein said polyacrylate thickening agent is sodium polyacrylate having a reactive group of 190 g/mole.

14. The dust suppressant concentrate as defined in claim 7, containing about 30%±2% of the coal tar pitch in anthracene oils and about 70%±2% water containing the water thickening agent, and being further diluted to obtain between 90 and 98% water and from 10 to 2% of the concentrate.

15. The dust suppressant concentrate as defined in claim 7, wherein for each 3 parts by weight of said anthracene oils, about 17 parts by weight of said pitch are present.

16. The dust suppressant concentrate as defined in claim 7, wherein said tar pitch dissolved in anthracene is between 30 and 40% of said dust suppressant concentrate.

17. A process for making a dust suppressant as defined in claim 1, wherein comprises:
   (a) adding to water having a pH of about 7 to 9, a thickening agent in an amount not exceeding 3% by weight of the water and dissolved in said water and forming with said water a dispersion medium having a viscosity of at least 2000 centipoises at 25° C. as measured by ASTM-D4420, with a Brookfield,
   (b) dispersing under high shear conditions into about 1.25 parts to 13 parts by weight of said dispersion medium, one part of coal tar pitch dissolved in an aromatic solvent, at least 70% of said aromatic solvent boiling over 270° C., and said aromatic solvent being present in an amount that renders liquid said pitch during its making,
   (c) to obtain a suspension having at least 45% water content.

18. The process as defined in claim 10, wherein said suspension as defined in claim 10 under (c) is a concentrate and contains about 30%±2% of the coal tar pitch dissolved in the aromatic solvent and about 70%±2% water containing said thickener, said thickener comprising a polyacrylate thickening agent which further includes diluting said suspension with water to obtain a dilute sprayable aqueous dust suppressant suspension having between 90 and 98% water and 10 to 2% of the concentrate.

19. The process as defined in claim 18 which further includes spraying said dilute sprayable suspension on coal, and wherein said aromatic solvent is anthracene oils and for each 3 parts by weight of said anthracene oils, about 17 parts by weight of pitch are present.

20. The process as defined in claim 19 wherein the sprayable suspension penetrates the surface of said coal down four inches or more to form said resilient layer.

21. The process as defined in claim 18, wherein said suspension is diluted to obtain based upon said diluted suspension from about 0.5 to 3% by weight of pitch dissolved in the aromatic solvent.

22. The process as defined in claim 17, which further includes diluting said suspension with water to obtain a diluted suspension having 2–10% by weight of said suspension as defined in claim 10, per 100 part of the diluted suspension and directly spraying said diluted suspension in an amount such that 10–40 grams of solids of the pitch dissolved in the aromatic solvent, are present per metric ton of dusting material.

23. The process as defined in claim 22 wherein said dusting material is coal.

24. The process as defined in claim 10, wherein said aromatic solvent is anthracene oils.

25. The process as defined in claim 10, wherein said aromatic solvent is anthracene oils, and for each part by weight of said dispersion medium, there is about an equivalent part by weight of the solution of pitch dissolved in said anthracene oils, and wherein the viscosity of the pitch is over 1000 centipoises at 50° C.

26. The process as defined in claim 17, wherein said aromatic solvent is anthracene oils, and there is from 20 to 55% by weight of said pitch dissolved in said anthracene oils, and from 80 to 45% of said dispersion medium.

27. The process as defined in claim 10, wherein said aromatic solvent is anthracene oils and wherein the step (b) is conducted when the pitch rendered liquid in anthracene oils is at a temperature above the boiling point of the dispersion medium.

28. The process as defined in claim 10, wherein the aromatic solvent is anthracene oils, and the resulting pitch dissolved in said anthracene oils has a viscosity at 100° C. of 210±25 cps, and at 150° C. of 35±5 cps.

29. The process according to claim 17, wherein the dispersion medium is at a temperature between 40° C. and 70° C.

30. The process as defined in claim 17, wherein said thickening agent is sodium polyacrylate.

31. The process as defined in claim 10, which further includes diluting said suspension as defined in claim 10, with water to obtain between 90 and 98% water containing said thickening agent and 10 and 2% by weight of said pitch dissolved in said aromatic solvent.

32. The process as defined in claim 10, wherein said aromatic solvent is anthracene oils and for each 3 parts by weight of said anthracene oils, about 17 parts by weight of said pitch are present, and which further includes diluting said suspension as defined in claim 10 with water to obtain between 10 and 2% by weight of said suspension and spraying said diluted suspension over the exposed surface of a car load of dusting material in an amount of 0.5 to 3 liter of the suspension as defined in said claim 10 under (c).

* * * * *